United States Patent
Suehiro et al.

(10) Patent No.: US 11,578,377 B2
(45) Date of Patent: Feb. 14, 2023

(54) GRAIN-ORIENTED ELECTRICAL STEEL SHEET AND METHOD FOR PRODUCING THE SAME

(71) Applicant: JFE Steel Corporation, Tokyo (JP)

(72) Inventors: Ryuichi Suehiro, Tokyo (JP); Makoto Watanabe, Tokyo (JP); Toshito Takamiya, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 89 days.

(21) Appl. No.: 16/611,642

(22) PCT Filed: May 10, 2018

(86) PCT No.: PCT/JP2018/018134
§ 371 (c)(1),
(2) Date: Nov. 7, 2019

(87) PCT Pub. No.: WO2018/207873
PCT Pub. Date: Nov. 15, 2018

(65) Prior Publication Data
US 2020/0063234 A1 Feb. 27, 2020

(30) Foreign Application Priority Data
May 12, 2017 (JP) .............................. JP2017-095738

(51) Int. Cl.
*C21D 9/46* (2006.01)
*C21D 6/00* (2006.01)
(Continued)

(52) U.S. Cl.
CPC .............. *C21D 9/46* (2013.01); *C21D 6/005* (2013.01); *C21D 6/008* (2013.01); *C21D 8/1222* (2013.01);
(Continued)

(58) Field of Classification Search
CPC .................................. C21D 9/46; C21D 6/005
(Continued)

(56) References Cited

U.S. PATENT DOCUMENTS 4,898,626 A 2/1990 Shoen et al.
4,975,127 A * 12/1990 Kurosawa ............ C21D 8/1244
148/113

(Continued)

FOREIGN PATENT DOCUMENTS

CN 105008557 A2 10/2015
CN 106414780 A 2/2017
(Continued)

OTHER PUBLICATIONS

International Search Report and Written Opinion for International Application No. PCT/JP2018/018134, dated Jul. 17, 2018, 5 pages.
(Continued)

*Primary Examiner* — Weiping Zhu
(74) *Attorney, Agent, or Firm* — RatnerPrestia

(57) ABSTRACT

A grain-oriented electrical steel sheet having excellent iron loss property is produced from a steel slab containing, by mass %, C: 0.002-0.15%, Si: 2.5-6.0%, Mn: 0.01-0.80%, Al: 0.010-0.050% and N: 0.003-0.020%, when: a heating rate between 500-700° C. in decarburization annealing is not less than 80° C./s, a surface roughness Ra of a work roll in final cold rolling is 0.01-3.0 μm, a total content of alkaline earth metals to MgO in annealing separator is 0-5 mass %, an average length L in rolling direction of passed crystal grains is not more than 25 mm, a ratio of crystal grains having a length in rolling direction of not more than 5 mm is 40-90%, and an existence ratio of alkaline earth metal sulfides having a size corresponding to circle of not less than 0.5 μm in a cross section of forsterite film is not more than 0.2/μm per unit length in sheet width direction.

12 Claims, 3 Drawing Sheets

(51) Int. Cl.
| | |
|---|---|
| *C21D 8/12* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/12* | (2006.01) |
| *C22C 38/16* | (2006.01) |
| *C22C 38/18* | (2006.01) |
| *C22C 38/60* | (2006.01) |

(52) U.S. Cl.
CPC ......... *C21D 8/1233* (2013.01); *C21D 8/1255* (2013.01); *C21D 8/1261* (2013.01); *C21D 8/1266* (2013.01); *C21D 8/1283* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/16* (2013.01); *C22C 38/18* (2013.01); *C22C 38/60* (2013.01)

(58) Field of Classification Search
USPC ..................................................... 252/62.59
See application file for complete search history.

(56) References Cited

U.S. PATENT DOCUMENTS

| | | | |
|---|---|---|---|
| 6,039,818 | A | 3/2000 | Toge et al. |
| 6,083,326 | A | 7/2000 | Komatsubara et al. |
| 2015/0027590 | A1* | 1/2015 | Nakanishi ............. C22C 38/002 148/111 |
| 2016/0012949 | A1 | 1/2016 | Uesaka et al. |
| 2017/0088915 | A1 | 3/2017 | Suehiro et al. |
| 2017/0274432 | A1 | 9/2017 | Okubo et al. |
| 2017/0298467 | A1 | 10/2017 | Suehiro et al. |
| 2017/0321296 | A1 | 11/2017 | Hayakawa et al. |
| 2017/0335425 | A1 | 11/2017 | Joo et al. |

FOREIGN PATENT DOCUMENTS

| | | |
|---|---|---|
| CN | 106574346 A | 4/2017 |
| EP | 0588342 A1 | 3/1994 |
| JP | 4015644 | 4/1963 |
| JP | 5833296 B2 | 7/1983 |
| JP | 06306469 A | 11/1994 |
| JP | 0762436 A | 3/1995 |
| JP | 07113120 A | 5/1995 |
| JP | 10183312 A | 7/1998 |
| JP | 10183313 A | 7/1998 |
| JP | 11302730 A | 11/1999 |
| JP | 2012207278 A | 10/2012 |
| JP | 2013139629 A | 7/2013 |
| JP | 5760590 B2 | 8/2015 |
| JP | 6098772 B2 | 3/2017 |
| WO | 2016056501 A1 | 4/2016 |
| WO | 2016098917 A1 | 6/2016 |

OTHER PUBLICATIONS

Chinese Office Action with Search Report for Chinese Application No. 201880030229.6, dated Jan. 27, 2021, 11 pages.
Extended European Search Report for European Application No. 18 798 526.2, dated Jan. 23, 2020, 9 pages.

* cited by examiner

GRAIN-ORIENTED ELECTRICAL STEEL SHEET AND METHOD FOR PRODUCING THE SAME

CROSS REFERENCE TO RELATED APPLICATIONS

This is the U.S. National Phase application of PCT/JP2018/018134, filed May 10, 2018, which claims priority to Japanese Patent Application No. 2017-095738, filed May 12, 2017, the disclosures of each of these applications being incorporated herein by reference in their entireties for all purposes.

FIELD OF THE INVENTION

This invention relates to a grain-oriented electrical steel sheet and a method for producing the same, and more particularly to a grain-oriented electrical steel sheet having an excellent iron loss property and a method for producing the same.

BACKGROUND OF THE INVENTION

An electrical steel sheet is a soft magnetic material widely used as an iron core material for transformers, motors and the like and includes a non-oriented electrical steel sheet and a grain-oriented electrical steel sheet. The grain-oriented electrical steel sheet particularly indicates excellent magnetic properties because crystal orientation is highly aligned into {110}<001> orientation called as Goss orientation, and is mainly used as an iron core material for large-size transformers. Therefore, the grain-oriented electrical steel sheet is required to be low in loss by magnetic excitation, or iron loss in order to reduce energy loss caused in the excitation of the transformer.

The iron loss of the grain-oriented electrical steel sheet can be divided into hysteresis loss and eddy current loss. The hysteresis loss can be reduced by increasing the accumulation degree of the crystal orientation into Goss orientation. For example, Patent Literature 1 discloses a method for producing a grain-oriented electrical steel sheet with a high orientation accumulation degree by causing fine precipitation of AlN in the production process and using the resultant as an inhibitor for pinning grain boundary in finish annealing to preferentially secondary-recrystallize Goss orientation.

Known techniques for reducing the eddy current loss include increasing specific resistance of steel by adding Si to reduce an eddy current produced in the excitation of a product. However, adding an excessive amount of Si leads to decrease in a saturated magnetic flux density and increase in a size of an iron core, so that there is a limit to the amount of Si to be added.

Another known technique for reducing the eddy current loss is to utilize film tension to subdivide magnetic domain width produced in the steel sheet or refine crystal grains. The former technique of utilizing film tension includes a method of forming a film composed mainly of forsterite onto the surface of the steel sheet, and a method of using the forsterite film as an underlying film and forming an insulation film composed mainly of phosphate and colloidal silica thereon. This method allows tensile stress to be applied to the steel sheet surface by utilizing the fact that the thermal expansion coefficient of forsterite and insulation film is smaller than that of a base metal. In particular, it is known that tensile stress in the rolling direction is effective for subdividing magnetic domain to reduce the iron loss.

The latter technique of refining the crystal grains includes, for example, a method disclosed in Patent Literature 2 that rapid heating is conducted in the heating process of decarburization annealing to promote primary recrystallization of Goss grains so that the grain size after secondary recrystallization is made fine. Also, Patent Literature 3 proposes a technique of reducing the iron loss by irradiating a high-temperature spot laser or pulse laser from the middle of primary recrystallization annealing to the start of secondary recrystallization and artificially forming a region in the interior of the steel sheet where a driving force of crystal growth is increased to form fine grains having a particle size of not more than 3 mm in the secondary recrystallization.

PATENT LITERATURE

Patent Literature 1: JP-B-S40-015644
Patent Literature 2: JP-A-H07-062436
Patent Literature 3: JP-A-H10-183312

SUMMARY OF THE INVENTION

However, it has become apparent from the inventors' studies that when a forsterite film or a forsterite film and an insulation film are formed on a grain-oriented electrical steel sheet having fine grains therein to obtain a product, the iron loss largely varies and finally the desired iron loss may not be obtained. Further, new equipment investment is necessary in order to form the region where the driving force of crystal growth is formed in the interior of the steel sheet by using a laser or the like from decarburization annealing to finish annealing or form fine grains in secondary recrystallization, causing a problem of increasing production cost.

The invention is made in view of the above problems inherent to the conventional technique, and an object thereof is to provide a grain-oriented electrical steel sheet having a tensile film and utilizing fine grains which is excellent in the iron loss property and small in variation of iron loss, and to propose an inexpensive production method thereof.

The inventors have first examined a method for reducing the iron loss by forming fine grains in a product sheet after secondary recrystallization without introducing an artificial strain. According to Patent Literature 3, naturally-formed fine grains are present other than artificially-formed fine grains, and such fine grains have an orientation very close to Goss orientation. Accordingly, a method of forming many Goss orientation grains in the texture before finish annealing is examined.

As previously described, it is effective to conduct a rapid heating in the heating process of decarburization annealing to refine secondary recrystallized grains. When the heating rate in the decarburization annealing is slow, recrystallization proceeds from <111>//ND orientation where much strains are introduced in cold rolling; on the other hand, when the rapid heating is conducted to allow the steel sheet to reach a higher temperature for a short time, recrystallization of orientations other than <111>//ND orientation proceeds, and especially recrystallization of Goss orientation is promoted. Since Goss orientation grains act as nuclei of secondary recrystallization, the more Goss orientation grains are present before the secondary recrystallization, the more secondary recrystallization is caused to make recrystallization grain size fine. In such a rapid heating method, however, the secondary recrystallized grains are finely refined averagely, so that fine grains cannot be placed in the steel sheet.

The inventors have focused on nucleus formation of Goss orientation. It is known that the nucleus of Goss orientation is formed in a shear band formed during the cold rolling. The shear band is generated by local concentration of shear stress in the cold rolling, so that the formation quantity thereof is expected to increase by increasing the shear stress in the rolling. The inventors have thus conceived a method of increasing the Goss orientation grains by changing a roughness of a rolling roll to increase a shear band formed during the cold rolling.

That is, an embodiment of the invention lies in a grain-oriented electrical steel sheet having a chemical composition comprising C: not more than 0.005 mass %, Si: 2.5 to 6.0 mass %, Mn: 0.01 to 0.80 mass %, S: not more than 0.005 mass %, Se: not more than 0.005 mass %, N: not more than 0.005 mass %, and the residue being Fe and inevitable impurities and provided on its surface with a forsterite film composed mainly of forsterite, characterized in that an average length L in a rolling direction of crystal grains that have the same size as the steel sheet thickness in the sheet direction is not more than 25 mm; a number ratio P of the number of crystal grains having a length in the rolling direction of not more than 5 mm to the total number of crystal grains falls within the range of 40 to 90%; and an existence ratio of sulfides of at least one alkaline earth metal selected from Ca, Sr and Ba having a circle-equivalent diameter of not less than 0.5 μm is not more than 0.2/μm per unit length in the sheet width direction when a cross section of the forsterite film is observed in the sheet width direction.

The grain-oriented electrical steel sheet according to an embodiment of the invention is further characterized by containing at least one selected from Cr: 0.010 to 0.500 mass %, Ni: 0.010 to 1.500 mass %, Sn: 0.005 to 0.500 mass %, Sb: 0.005 to 0.500 mass %, P: 0.005 to 0.500 mass %, Cu: 0.010 to 0.500 mass %, Mo: 0.005 to 0.100 mass %, B: 0.0002 to 0.0025 mass %, Nb: 0.0010 to 0.0100 mass % and V: 0.0010 to 0.0100 mass % in addition to the above chemical composition.

Also, an embodiment of the invention is a method for producing the above-described grain-oriented electrical steel sheet by heating and hot rolling a steel slab having a chemical composition comprising C: 0.002 to 0.15 mass %, Si: 2.5 to 6.0 mass %, Mn: 0.01 to 0.80 mass %, Al: 0.010 to 0.050 mass %, N: 0.003 to 0.020 mass % and the residue being Fe and inevitable impurities to form a hot rolled sheet, subjecting the hot rolled sheet to a hot band annealing and further to a single cold rolling or two or more cold rollings including an intermediate annealing therebetween to form a cold rolled sheet having a final sheet thickness, subjecting the cold rolled sheet to decarburization annealing, applying an annealing separator composed mainly of MgO to the surface of the steel sheet, drying and subjecting to finish annealing, characterized in that a heating rate within a temperature range of 500 to 700° C. in a heating process of the decarburization annealing is not less than 80° C./s, and a surface roughness of a work roll used in a final cold rolling of the cold rolling is within the range of 0.01 to 3.0 μm as an arithmetic average roughness Ra, and a compound of at least one alkaline earth metal selected from Ca, Sr and Ba is contained in an amount of 0 to 5 mass % in total as converted to an alkaline earth metal to MgO as the annealing separator composed mainly of MgO.

The steel slab used in the method for producing the grain-oriented electrical steel sheet according to an embodiment of the invention is characterized by containing one or two selected from S: 0.002 to 0.030 mass % and Se: 0.002 to 0.100 mass % in addition to the above chemical composition.

The steel slab used in the method for producing the grain-oriented electrical steel sheet according to an embodiment of the invention is characterized by containing one or more selected from Cr: 0.010 to 0.500 mass %, Ni: 0.010 to 1.500 mass %, Sn: 0.005 to 0.500 mass %, Sb: 0.005 to 0.500 mass %, P: 0.005 to 0.500 mass %, Cu: 0.010 to 0.500 mass %, Mo: 0.005 to 0.100 mass %, B: 0.0002 to 0.0025 mass %, Nb: 0.0010 to 0.0100 mass % and V: 0.0010 to 0.0100 mass % in addition to the above chemical composition.

According to the invention, it is possible to provide a grain-oriented electrical steel sheet having an excellent iron loss property and a small variation of iron loss at a low cost.

DETAILED DESCRIPTION OF EMBODIMENTS OF THE INVENTION

Experiments that led to the development of the invention will be described below.

Experiment 1

A steel slab containing C: 0.06 mass %, Si: 3.3 mass %, Mn: 0.05 mass %, Al: 0.02 mass % and N: 0.01 mass % is heated to 1420° C. and hot rolled to form a hot rolled sheet having a sheet thickness of 2.4 mm. The hot rolled sheet is subjected to a hot band annealing at 1040° C. for 60 seconds, the first cold rolling to have an intermediate sheet thickness of 1.8 mm, an intermediate annealing at 1120° C. for 80 seconds, and the second cold rolling to form a cold rolled sheet having a final sheet thickness of 0.23 mm. A work roll in a Sendzimir mill used in the final cold rolling has a roll diameter of 80 mm, and a surface roughness thereof is variously changed as an arithmetic average roughness Ra. Then, a test specimen having a length in rolling direction of 100 mm and a length in the sheet width direction of 300 mm is cut out from a widthwise central portion of the cold rolled sheet.

Next, the test specimen is subjected to a decarburization annealing at 850° C. for 80 seconds in a wet atmosphere of 50 vol % $H_2$-50 vol % $N_2$ (dew point: 60° C.). The heating rate V from 500 to 700° C. in the heating process of the decarburization annealing is changed to two levels of 50° C./s and 80° C./s.

The test specimen is thereafter coated on its surface with an annealing separator composed mainly of MgO, dried and subjected to a finish annealing comprised of a secondary recrystallization annealing and a purification annealing for holding at 1200° C. for 7 hours in a hydrogen atmosphere.

Figure 1:
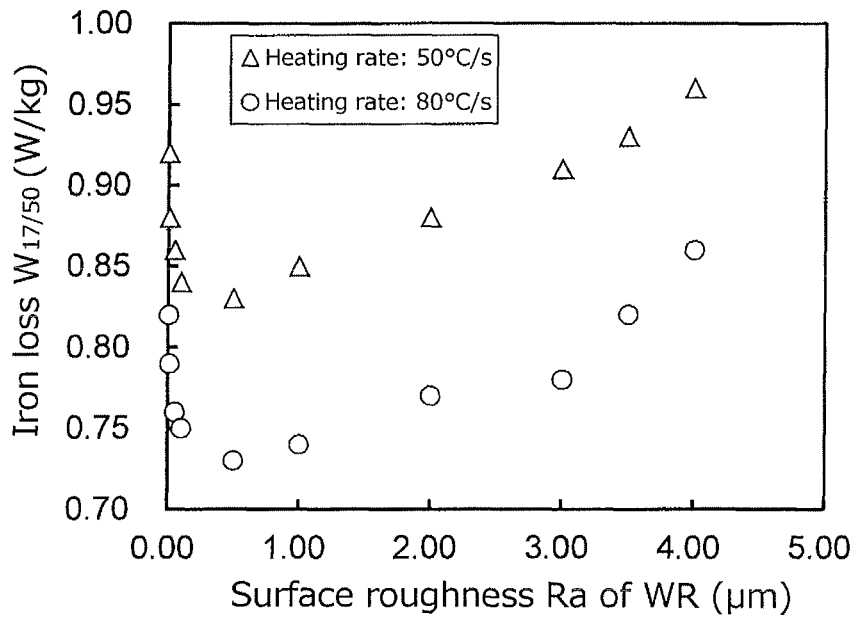
FIG. 1 is a graph showing a relation between an average roughness Ra of a work roll used in cold rolling and an iron loss $W_{17/50}$.

The iron loss $W_{17/50}$ of the thus obtained test specimen after the finish annealing is measured at a magnetic excitation frequency of 50 Hz according to JIS C2550. FIG. 1 shows a relation between a surface roughness Ra of the work roll and an iron loss $W_{17/50}$. As seen from this figure, a good iron loss of not more than 0.80 W/kg is obtained when the surface roughness Ra of the work roll is within the range of 0.01 to 3.0 μm.

In order to investigate the reason why the iron loss is increased by coarsening the surface roughness Ra of the work roll, the forsterite film is removed from the surface of the steel sheet to expose the base metal, and thereafter an average length L of crystal grains in rolling direction on the steel sheet surface that penetrate through the steel sheet in the thickness direction thereof and a number ratio P of crystal grains having a length in rolling direction of not more than 5 mm, irrespectively of whether the crystal grains penetrate through the steel sheet in the thickness direction or not, to total crystal grains are measured. The measurement of L and P is performed such that a zone surrounded by a closed grain boundary is regarded as one crystal grain and the length of the crystal grain in the rolling direction is measured.

As a result, it can be seen that the average grain size L falls within the range of 29 to 32 mm when the heating rate V is 50° C./s, while L is made fine to the range of 19 to 22 mm when the heating rate V is 80° C./s.

Figure 2:
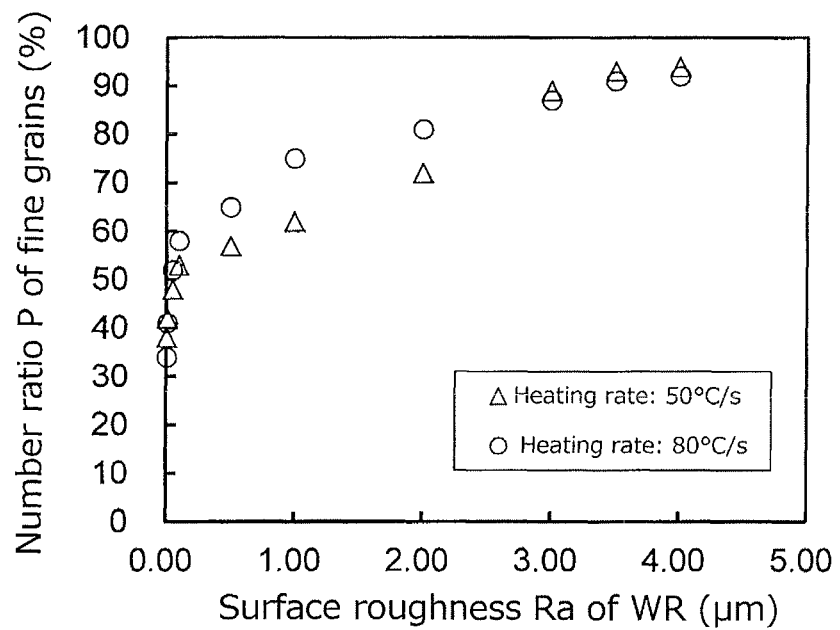
FIG. 2 is a graph showing a relation between a surface roughness Ra of a work roll used in cold rolling and a number ratio P of fine crystal grains.

FIG. 2 shows a relation between a surface roughness Ra of the work roll and a number ratio P of the fine grains. As seen from this figure, the number ratio P of fine grains having a length in the rolling direction of not more than 5 mm increases as Ra becomes coarser.

The inventors have considered the reason why a large number of fine grains are formed by roughening the surface of the work roll in the cold rolling is that the shear stress applied to the steel sheet in the cold rolling increases as the surface roughness becomes coarser and promote the formation of shear band, so that the formation of Goss orientation nucleus is promoted.

Figure 3:
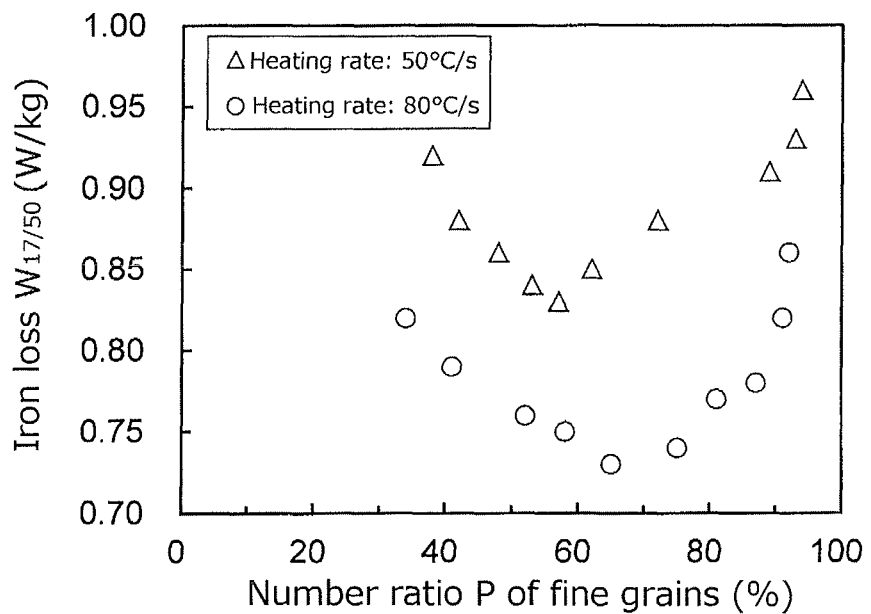
FIG. 3 is a graph showing a relation between a number ratio P of fine grains and an iron loss $W_{17/50}$.

FIG. 3 shows a relation between a number ratio P of fine grains and an iron loss $W_{17/50}$. As seen from this figure, a good iron loss is obtained when the number ratio P of the fine grains is within the range of 40 to 90%. When the number ratio P of the fine grains is not less than 40%, crystal grain boundary is increased, and hence the magnetic domain subdividing effect is caused to improve the iron loss. However, when it exceeds 90%, the dispersion of crystal orientation of the fine grains is increased to decrease the magnetic flux density and rather increase the hysteresis loss. Therefore, there seems to be a proper range for the number ratio P of the fine grains.

From the results of the above experiment, it can be seen that the iron loss property can be improved by forming fine grains without artificially introducing strain. However, inventors' further examinations reveal that the variation of the iron loss is still large and the intended iron loss cannot be obtained even when the average crystal grain size and the number ratio P of the fine grains are within the above ranges.

In order to investigate influences other than of the base metal, the inventors have examined a forsterite film formed on the surface of the base metal. As a result, it becomes clear that the forsterite film in a product having a large iron loss has low film tension as compared to a film having an excellent iron loss property.

In order to further investigate the cause of the low film tension, a cross section of the forsterite film in the sheet width direction is examined with a SEM. As a result, it is confirmed that many coarse sulfides of Ca, Sr or Ba are formed in the forsterite film having a low film tension so as to penetrate into gaps between crystal grains of forsterite. Since these sulfides are large in the thermal expansion coefficient as compared to the forsterite and base metal, they are considered to have an effect of mitigating the film tension due to the difference of thermal expansion coefficient between the base metal and forsterite.

The following experiment is conducted to investigate the influence of the formation amount of sulfide upon the iron loss.

Experiment 2

A test specimen is taken out from the steel sheet prepared in Experiment 1 subjected to decarburization annealing under conditions that a surface roughness Ra of the work roll used in the cold rolling is 0.5 μm and a heating rate V from 500 to 700° C. is 80° C./s. The test specimen is coated with an annealing separator composed mainly of MgO and containing any one of Ca, Sr and Ba in a various proportion, dried and then subjected to a finish annealing comprised of secondary recrystallization annealing and purification annealing for holding at 1200° C. for 7 hours in a hydrogen atmosphere.

An iron loss $W_{17/50}$ of the thus obtained test specimen after the finish annealing is measured at a magnetic excitation frequency of 50 Hz according to JIS C2550. Further, a cross section of the forsterite film in the sheet width direction is observed with a SEM. The observation with the SEM is performed in five visual fields, wherein one visual filed is set to have a width of 60 μm in the sheet width direction, and the number of Ca, Sr and Ba sulfides in the forsterite film is measured from the SE image and EDX spectrum in each visual field to determine the number of sulfides having a circle-equivalent diameter of not less than 0.5 μm, whereby an existence ratio per unit length in the sheet width direction is determined from the average of the five visual fields.

Figure 4:
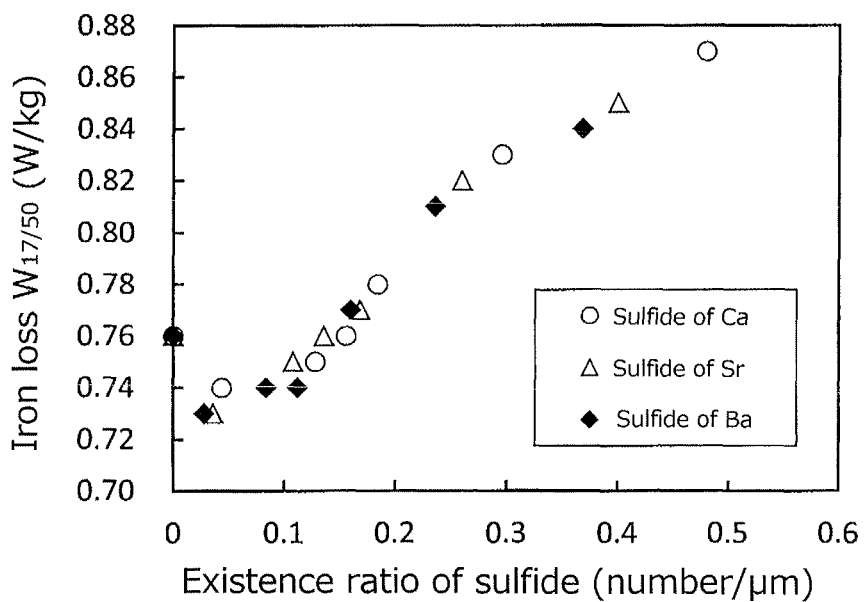
FIG. 4 is a graph showing a relation between an existence ratio of sulfides and an iron loss $W_{17/50}$.
Figure 5:
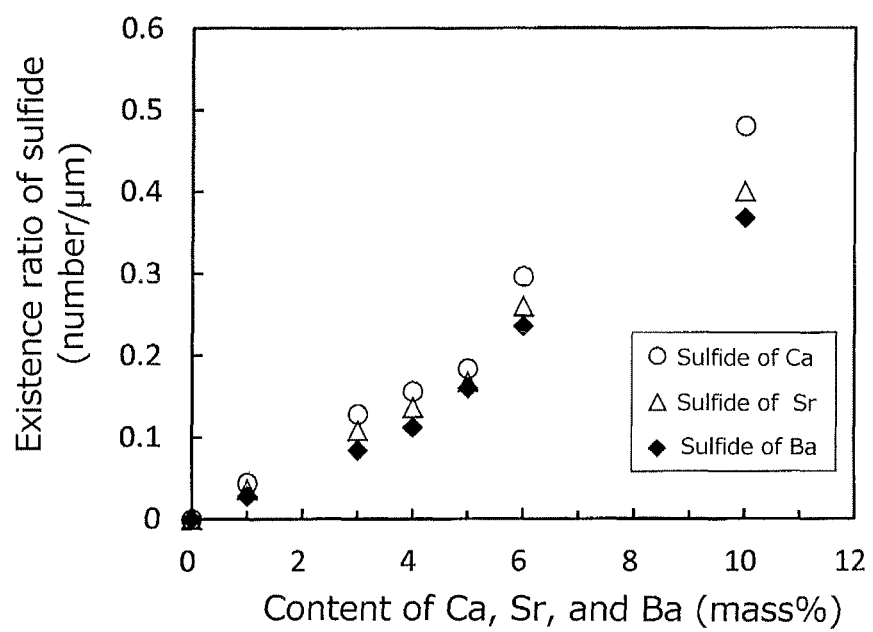
FIG. 5 is a graph showing a relation between a content ratio of Ca, Sr and Ba in an annealing separator and an existence ratio of sulfides in a forsterite film.

FIG. 4 shows a relation between an existence ratio of sulfides and an iron loss $W_{17/50}$. As seen from this figure, a good iron loss is obtained when the existence ratio of sulfides in the forsterite film is not more than 0.2/μm. Further, FIG. 5 shows a relation between Ca, Sr and Ba content ratios in the annealing separator and the existence ratio of sulfides in the forsterite film. As seen from this figure, the content ratios of Ca, Sr and Ba in the annealing separator are necessary to be not more than 5 mass % to obtain the good iron loss.

The invention is developed by adding further examinations to the novel knowledge obtained from the above experiments.

A grain-oriented electrical steel sheet (product sheet) according to embodiments of the invention will be described below.

The grain-oriented electrical steel sheet according to an embodiment of the invention is necessary to have a chemical composition in which Si: 2.5 to 6.0 mass % and Mn: 0.01-0.80 mass % are contained.

Si is an element necessary for increasing a specific resistance of steel and reducing an eddy current loss. This effect is insufficient when the Si content is less than 2.5 mass %, while when it exceeds 6.0 mass %, the workability is deteriorated to make it difficult to form the steel sheet into an iron core. Preferably, it is within the range of 2.8 to 4.5 mass %.

Mn has an effect of increasing the specific resistance of steel similarly to Si, but is added mainly for the purpose of increasing hot workability of steel. This effect is insufficient when the Mn content is less than 0.01 mass %, while when it exceeds 0.80 mass %, the magnetic flux density is decreased. Preferably, it is within the range of 0.05 to 0.40 mass %.

The chemical composition of the grain-oriented electrical steel sheet according to an embodiment of the invention contains Fe and inevitable impurities as residue other than Si and Mn. The contents of C, N, S and Se in the inevitable impurities are preferably C: not more than 0.005 mass %, N: not more than 0.005 mass %, S: not more than 0.005 mass % and Se: not more than 0.005 mass %. These elements, C, N, S, and Se are added as an inhibitor forming element for increasing the magnetic flux density of a product at a steel-making stage. When these elements remain in the product sheet, precipitates are formed to conduct pinning of magnetic domain displacement to thereby deteriorate iron loss property, so that they are preferably decreased to the above ranges in the production process. More preferably, they are C: not more than 0.003 mass %, N: not more than 0.002 mass %, S: not more than 0.002 mass % and Se: not more than 0.002 mass %.

Moreover, the grain-oriented electrical steel sheet according to the invention may contain, in addition to Si and Mn, one or more selected from Cr: 0.010 to 0.500 mass %, Ni: 0.010 to 1.500 mass %, Sn: 0.005 to 0.500 mass %, Sb: 0.005 to 0.500 mass %, P: 0.005 to 0.500 mass %, Cu: 0.010 to 0.500 mass %, Mo: 0.005 to 0.100 mass %, B: 0.0002 to 0.0025 mass %, Nb: 0.0010 to 0.0100 mass % and V: 0.0010 to 0.0100 mass % in accordance with various purposes.

In the grain-oriented electrical steel sheet according to an embodiment of the invention, crystal grains that penetrate through the steel sheet in the thickness direction thereof are necessary to have an average length L in the rolling direction on the steel sheet surface of not more than 25 mm. When the average length L is more than the above value, the effect of subdividing magnetic domains cannot be obtained sufficiently. The average length L is preferably not more than 20 mm.

In the grain-oriented electrical steel sheet according to an embodiment of the invention, it is necessary that a number ratio P of fine crystal grains having a length in the rolling direction of not more than 5 mm to total crystal grains falls within the range of 40 to 90%. The fine crystal grains having the length in the rolling direction of not more than 5 mm are effective for further enhancing the effect of subdividing magnetic domains. The effect becomes remarkable when the ratio to total crystal grains is not less than 40%. When it exceeds 90%, however, the displacement of the fine grains from the Goss orientation becomes larger and the magnetic flux density is decreased to deteriorate the iron loss property. Preferably, it is within the range of 50 to 80%. Moreover, the fine grains are not necessary to be the crystal grains that penetrate through the steel sheet in the thickness direction thereof.

The grain-oriented electrical steel sheet according to an embodiment of the invention is necessary to be provided on the steel sheet surface with a forsterite film composed mainly of forsterite. When the forsterite film is observed at a cross section in the sheet width direction thereof, it is necessary that an existence ratio of sulfides of alkaline earth metals having a circle-equivalent diameter of not less than 0.5 µm, concretely Ca, Sr and Ba sulfides is not more than 0.2/µm per unit length in the sheet width direction. When the sulfides having the above size are present in the forsterite film, the film tension of forsterite is weakened to deteriorate the iron loss property. Moreover, the preferable existence ratio of sulfides of alkaline earth metals is not more than 0.13/µm per unit length in the sheet width direction.

When the grain-oriented electrical steel sheet according to the invention is used in a laminated form, it is preferable that an insulation film is applied onto the forsterite film in order to improve the iron loss properties.

The method for producing a grain-oriented electrical steel sheet according to embodiments of the invention will be described below.

The chemical composition of a steel slab to be a raw material for the grain-oriented electrical steel sheet according to an embodiment of the invention will be first explained.

C: 0.002 to 0.15 mass %

When C content is less than 0.002 mass %, the effect of strengthening grain boundary by C is lost to generate cracking of slab, which will interfere with the production. C is an austenite forming element and is useful for enhancing a maximum fraction of y-phase to refine a texture of the slab. However, when C content exceeds 0.15 mass %, it is difficult to reduce C to not more than 0.005 mass % causing no magnetic aging in the decarburization annealing. Therefore, the C content is within the range of 0.002 to 0.15 mass %. Preferably, it is within the range of 0.01 to 0.10 mass %.

Si: 2.5 to 6.0 mass %

Si is an element required for increasing the specific resistance of steel to reduce an eddy current loss. This effect is insufficient when the Si content is less than 2.5 mass %, while when it exceeds 6.0 mass %, secondary recrystallization is difficult to be caused and the workability is deteriorated and the production by rolling becomes difficult. Therefore, the Si content falls within the range of 2.5 to 6.0 mass %. It is preferably 2.5 to 4.6 mass %, more preferably 3.0 to 4.0 mass %.

Mn: 0.01 to 0.80 mass %

Mn is an element required for improving hot workability of steel. This effect is insufficient when the Mn content is less than 0.01 mass %, while when it exceeds 0.80 mass %, the magnetic flux density of the product sheet is decreased. Therefore, the Mn content falls within the range of 0.01 to 0.80 mass %. It is preferably within the range of 0.02 to 0.50 mass %.

Al: 0.010 to 0.050 mass % and N: 0.003 to 0.020 mass %

Al and N are elements required as an inhibitor forming element. When they are less than the above lower limit, the inhibitor forming effect cannot be obtained sufficiently, while when they exceed the above upper limit, solid-solution temperature in the reheating of the slab becomes too, high and non-soluted portions remain even after the reheating of the slab to bring about the deterioration of the magnetic properties. Therefore, they are within ranges of Al: 0.010 to 0.050 mass % and N: 0.003 to 0.020 mass %. Preferably, they are Al: 0.015 to 0.035 mass % and N: 0.005 to 0.015 mass %.

The steel slab as being a raw material for the grain-oriented electrical steel sheet according to the invention contains Fe and inevitable impurities as the residue other than the basic chemical composition, and may also contain the following elements.

One or two selected from S: 0.002 to 0.030 mass % and Se: 0.002 to 0.100 mass %

Both S and Se are bonded to Mn to form an inhibitor. However, when each content is less than the above lower limit, the inhibitor effect cannot be obtained sufficiently, while when it exceeds the above upper limit, the solid-solution temperature in the reheating of the slab becomes too high and non-soluted portions remain even after the reheating of the slab to bring about the deterioration of the magnetic properties. Therefore, when S and Se are added, the content ranges are preferably S: 0.002 to 0.030 mass % and Se: 0.002 to 0.100 mass %. More preferably, S is within the range of 0.005 to 0.020 mass % and Se is within the range of 0.010 to 0.050 mass %.

Cr: 0.010-0.500 mass %

Cr is an element useful for stabilizing the formation of a forsterite film in finish annealing to mitigate the formation of a poor film. However, when the content is less than 0.010 mass %, the above effect is poor, while it exceeds 0.500 mass %, the magnetic flux density is decreased. When Cr is added, therefore, it preferably falls within the range of 0.010 to 0.500 mass %. More preferably, it is within the range of 0.050 to 0.400 mass %.

Ni: 0.010 to 1.500 mass %

Ni is an austenite forming element which is effective for increasing a maximum γ-phase fraction of the slab. However, when the content is less than 0.010 mass %, the above effect is small, while when it exceeds 1.500 mass %, the workability is decreased to deteriorate sheet threading property and also secondary recrystallization becomes unstable to deteriorate the magnetic properties. When Ni is added, therefore, it preferably falls within the range of 0.010 to 1.500 mass %. More preferably, it is within the range of 0.100 to 1.000 mass %.

One or more selected from Sn: 0.005 to 0.500 mass %, Sb: 0.005 to 0.500 mass %, P: 0.005 to 0.500 mass %, Cu: 0.010 to 0.500 mass % and Mo: 0.005 to 0.100 mass %

Sn, Sb, P, Cu and Mo are elements useful for improving the magnetic properties. When each content is less than the above respective lower limit, the effect of improving the magnetic properties is poor, while when each content exceeds the above respective upper limit, secondary recrystallization becomes unstable to rather deteriorate the magnetic properties. When the above elements are added, therefore, the addition amounts preferably fall within the above ranges. They are more preferably Sn: 0.01 to 0.10 mass %, Sb: 0.01 to 0.10 mass %, P: 0.01 to 0.10 mass %, Cu: 0.05 to 0.300 mass % and Mo: 0.01 to 0.05 mass %.

One or more selected from B: 0.0002 to 0.0025 mass %, Nb: 0.0010 to 0.0100 mass % and V: 0.0010 to 0.0100 mass %

B, Nb and V work as an auxiliary inhibitor by forming fine precipitates of nitride or carbide, so that they are useful for increasing the magnetic flux density. However, when each content is less than the above respective lower limit, the effect of improving the magnetic properties is poor, while when each content exceeds the above respective upper limit, the purification in the finish annealing becomes difficult to rather deteriorate the iron loss property. When these elements are added, therefore, the addition amounts preferably fall within the above ranges. They are more preferably B: 0.0002 to 0.0015 mass %, Nb: 0.0010 to 0.0060 mass % and V: 0.0010 to 0.0060 mass %.

Next, the method for producing a grain-oriented electrical steel sheet according to embodiments of the invention will be described below.

Steel Slab

The raw steel material (slab) used in the method for producing a grain-oriented electrical steel sheet according to the invention may be produced by melting a steel having the aforementioned chemical composition through the usual refining process using a convertor, vacuum degassing device or the like and thereafter conducting the usual continuous casting method or an ingot making—blooming method, or may be a thin cast slab having a thickness of not more than 100 mm formed by a direct casting method, and it is not particularly restricted.

Reheating and Hot Rolling of Slab

The steel slab is reheated to a temperature of about 1200 to 1400° C. according to the usual manner before hot rolling to dissolve inhibitor forming elements as a solid solution and thereafter hot rolled to form a hot rolled sheet. The hot rolling is preferably performed under a condition that an end temperature of the rough rolling, if conducted, is not lower than 1100° C. and an end temperature of finish rolling is not lower than 900° C.

Hot Band Annealing

The steel sheet after the hot rolling is subjected to a hot band annealing. The soaking temperature in the hot band annealing preferably falls within the range of 800 to 1150° C. to obtain good magnetic properties. When the soaking temperature is lower than 800° C., a band structure formed in the hot rolling remains and it is difficult to obtain a primary recrystallized structure of well-ordered grains, resulting that growth of secondary recrystallized grains may be suppressed. Meanwhile, when the soaking temperature exceeds 1150° C., the grain size after the hot band annealing becomes too coarsened and rather the primary recrystallized structure of well-ordered grain is difficult to obtain. Moreover, a soaking time in the hot band annealing is preferably about 10 to 600 seconds.

Cold Rolling

Then, the steel sheet after the hot band annealing is subjected to one cold rolling or two or more cold rollings including an intermediate annealing therebetween to form a cold rolled sheet having a final sheet thickness. The soaking temperature in the intermediate annealing, when conducted, preferably falls within the range of 900 to 1200° C. When the soaking temperature is lower than 900° C., recrystallized grains after the intermediate annealing become finer and Goss nuclei in the primary recrystallized structure decrease, resulting that the magnetic properties of a product sheet may be deteriorated. Meanwhile, when the soaking temperature exceeds 1200° C., the crystal grains become too coarsened and the primary recrystallized structure of well-ordered grains becomes difficult to obtain, similarly when the hot band annealing is conducted. Moreover, the soaking time in the intermediate annealing is preferably about 10 to 600 seconds.

In an embodiment of the invention, it is important that a surface roughness Ra of a work roll in a Sendzimir mill for performing a final cold rolling in the cold rolling is necessary to be controlled to a range of 0.01 to 3.0 µm. When the surface roughness Ra is less than the above range, an introduction amount of shear band is insufficient and Goss orientation nuclei are not formed sufficiently, so that fine grains in the product sheet are decreased, and a good iron loss property cannot be obtained. Meanwhile, when Ra exceeds 3.0 µm, the number of fine grains is too much increased and many crystal grains having a crystal orientation shifted from the Goss orientation are formed, and hence the magnetic flux density is decreased to deteriorate the iron loss property. The surface roughness Ra of the work roll preferably falls within the range of 0.05 to 2.0 µm. Further preferably, it is within the range of 0.1 to 1.2 μm. Also, the diameter of the work roll used in the final cold rolling is preferably not more than 150 mmϕ, more preferably not more than 100 mmϕ from a viewpoint of ensuring a friction coefficient.

Decarburization Annealing

The cold rolled sheet having the final sheet thickness is thereafter subjected to a decarburization annealing combined with a primary recrystallization annealing. In the decarburization annealing, it is necessary that an annealing rate V from 500 to 700° C. in the heating process is not less than 80° C./s. When the heating rate V is less than 80° C./s, the primary recrystallization of Goss orientation nucleus is insufficient and crystal grains in the product sheet become coarsened, and hence the good iron loss property cannot be obtained. The heating rate V is preferably not less than 120° C./s.

The soaking temperature in the decarburization annealing preferably falls within the range of 700 to 1000° C. When the soaking temperature is lower than 700° C., the primary recrystallization and decarburization are not advanced sufficiently and the desired primary recrystallization texture cannot be obtained. On the other hand, when it exceeds 1000° C., the primary recrystallized grains become so coarsened that a driving force for secondary recrystallization of Goss orientation grains in the subsequent finish annealing is lost, which may make it difficult to cause secondary recrystallization. Moreover, a soaking time in the decarburization annealing is preferably about 10 to 600 seconds.

Annealing Separator

The steel sheet subjected to the decarburization annealing is thereafter coated with an annealing separator composed mainly of MgO onto the surface and dried. Here, the annealing separator is necessary to contain compounds of one or more alkaline earth metals selected from Ca, Sr and Ba in a total amount of 0 to 5 mass % to MgO as converted to the alkaline earth metal. The compounds of the alkaline earth metal contained in the forsterite film within the above range can improve the adhesiveness of the forsterite film. However, when the content of the alkaline earth metal compounds exceeds 5 mass %, a coarse sulfide is formed to reduce the film tension of the forsterite film and increase the iron loss. Therefore, Ca, Sr and Ba as a sulfide forming element are contained within the range of 0 to 5 mass % in total. Preferably, it is within the range of 0.5 to 4 mass %.

Finish Annealing

The steel sheet coated with the annealing separator and dried is then subjected to a finish annealing comprised of a secondary recrystallization annealing and a purification annealing, whereby a secondary recrystallization structure highly aligned in Goss orientation is developed and a forsterite film is formed. Moreover, a temperature in the finish annealing is preferably raised to about 1200° C. for the purification annealing and for the formation of the forsterite film.

An annealing atmosphere may follow the standard method conditions and is not particularly limited, but is desirably an atmosphere having a high hydrogen content in the purification annealing for the purpose of purifying steel.

The steel sheet after the finish annealing is then subjected to washing with water, brushing, pickling or the like to remove the non-reacted annealing separator adhered to the steel sheet surface and further to a flattening annealing to correct the shape, which is effective to reduce the iron loss. Such a shape correction is performed to prevent the deterioration of the properties due to the coiling tendency in the measurement of the iron loss because the finish annealing is usually conducted at a coiling state.

When the steel sheet according to an embodiment of the invention is used in a laminated form, it is effective to form an insulation film onto the steel sheet surface in the flattening annealing or before or after thereof. Especially, in order to reduce the iron loss, it is preferable to form a tension-imparting film which applies a tension to the steel sheet as the insulation film. It is more preferable that the tension-imparting film is formed by adopting a method of applying the tensile film through a binder or a method of vapor-depositing an inorganic material onto a surface layer of the steel sheet through a physical deposition process or a chemical deposition process, resulting that an insulation film having an excellent film adhesiveness and an effect of considerably reducing the iron loss can be formed.

In order to further reduce the iron loss, it is preferable to perform magnetic domain subdividing treatment, which includes a conventionally practiced method of forming grooves in a final product sheet, a method of introducing thermal strain or impact strain in linear form or dotted form by electron beam irradiation, laser irradiation or plasma irradiation, a method of forming grooves by etching the steel sheet surface in an intermediate step of the steel sheet cold rolled to the final sheet thickness and so on.

Moreover, the production conditions other than the above may follow the conditions of the standard production method for the grain-oriented electrical steel sheet.

Example 1

A steel slab comprising C: 0.07 mass %, Si: 3.4 mass %, Mn: 0.11 mass %, Al: 0.025 mass %, N: 0.015 mass % and the residue being Fe and inevitable impurities is manufactured by a continuous casting method. The slab is reheated to a temperature of 1410° C. and hot rolled to form a hot rolled sheet having a sheet thickness of 2.4 mm. The hot rolled sheet is subjected to a hot band annealing at 1000° C. for 50 seconds, cold rolled to have an intermediate sheet thickness of 1.8 mm, subjected to an intermediate annealing at 1100° C. for 20 seconds and finally cold rolled to form a cold rolled sheet having a sheet thickness of 0.23 mm. A work roll in a Sendzimir mill used in the final cold rolling has a roll diameter of 70 mmϕ and a surface roughness Ra thereof is variously changed as shown in Table 1.

The cold rolled sheet is then subjected to a decarburization annealing in a wet atmosphere of 50 vol % $H_2$-50 vol % $N_2$ (dew point: 58° C.) at 850° C. for 100 seconds. The heating rate V from 500 to 700° C. in the heating process of the decarburization annealing is variously changed as shown in Table 1.

The steel sheet is thereafter coated with an annealing separator composed mainly of MgO and containing 1 mass % of $SrCO_3$ as converted to Sr with respect to MgO and subjected to a finish annealing comprising heating to 1200° C. in a $N_2$ atmosphere, holding at 1200° C. for 10 hours in a $H_2$ atmosphere and lowering the temperature in a $N_2$ atmosphere.

A test specimen is taken out from the thus obtained steel sheet to measure magnetic properties (iron loss $W_{17/50}$) by a method described in JIS C2550.

The forsterite film is removed from the test specimen, and thereafter an average length L of crystal grains in a rolling direction on the surface that penetrate through the steel sheet in the thickness direction thereof and a number ratio P of crystal grains having a length in the rolling direction of not more than 5 mm to total crystal grains are measured.

Table 1 shows the above measured results. As seen from this table, all of the steel sheets produced under the production conditions according to embodiments of the invention have a good iron loss because the average length L in the rolling direction of the crystal grains that penetrate through the steel sheet in the thickness direction thereof is not more than 25 mm and the number ratio P of fine grains is within the range of 40 to 90%.

TABLE 1

| | | | Steel sheet properties | | | |
|---|---|---|---|---|---|---|
| Steel sheet No. | Surface roughness Ra of WR in cold rolling (μm) | Heating rate V in decarburization annealing (° C./s) | Average length L in rolling direction (mm) | Number ratio P of fine grains % | Iron loss $W_{17/50}$ (W/kg) | Remarks |
| 1 | 0.005 | 50 | 29 | 39 | 0.93 | Comparative Example |
| 2 | 0.01 | 50 | 30 | 40 | 0.87 | Comparative Example |
| 3 | 0.05 | 50 | 31 | 47 | 0.86 | Comparative Example |
| 4 | 0.1 | 50 | 32 | 52 | 0.84 | Comparative Example |
| 5 | 0.5 | 50 | 31 | 56 | 0.83 | Comparative Example |
| 6 | 1.0 | 50 | 30 | 60 | 0.85 | Comparative Example |
| 7 | 2.0 | 50 | 30 | 74 | 0.87 | Comparative Example |
| 8 | 3.0 | 50 | 29 | 89 | 0.90 | Comparative Example |
| 9 | 3.5 | 50 | 29 | 92 | 0.92 | Comparative Example |
| 10 | 4.0 | 50 | 28 | 93 | 0.95 | Comparative Example |
| 11 | 0.005 | 80 | 21 | 34 | 0.83 | Comparative Example |
| 12 | 0.01 | 80 | 22 | 40 | 0.79 | Invention Example |
| 13 | 0.05 | 80 | 21 | 51 | 0.75 | Invention Example |
| 14 | 0.1 | 80 | 19 | 59 | 0.73 | Invention Example |
| 15 | 0.5 | 80 | 21 | 66 | 0.71 | Invention Example |
| 16 | 1.0 | 80 | 22 | 76 | 0.72 | Invention Example |
| 17 | 2.0 | 80 | 20 | 82 | 0.75 | Invention Example |
| 18 | 3.0 | 80 | 21 | 86 | 0.79 | Invention Example |
| 19 | 3.5 | 80 | 18 | 92 | 0.84 | Comparative Example |
| 20 | 4.0 | 80 | 19 | 93 | 0.88 | Comparative Example |
| 21 | 0.01 | 200 | 14 | 42 | 0.79 | Invention Example |
| 22 | 1.0 | 200 | 12 | 77 | 0.72 | Invention Example |
| 23 | 3.0 | 200 | 15 | 87 | 0.71 | Invention Example |
| 24 | 0.01 | 500 | 10 | 41 | 0.78 | Invention Example |
| 25 | 1.0 | 500 | 9 | 76 | 0.69 | Invention Example |
| 26 | 3.0 | 500 | 9 | 88 | 0.68 | Invention Example |

Example 2

A steel slab comprising C: 0.08 mass %, Si: 3.2 mass %, Mn: 0.09 mass %, Al: 0.024 mass %, N: 0.011 mass %, S: 0.01 mass %, Se: 0.01 mass % and the residue being Fe and inevitable impurities is manufactured by a continuous casting method. The slab is reheated to a temperature of 1400° C. and hot rolled to form a hot rolled sheet having a sheet thickness of 2.2 mm. The hot rolled sheet is subjected to a hot band annealing at 1000° C. for 50 seconds, cold rolled to have an intermediate sheet thickness of 1.7 mm, subjected to an intermediate annealing at 1100° C. for 20 seconds and finally cold rolled to form a cold rolled sheet having a sheet thickness of 0.23 mm. A work roll in a Sendzimir mill used in the final cold rolling has a roll diameter of 130 mmϕ and a surface roughness Ra of 0.5 μm.

The cold rolled sheet is then subjected to a decarburization annealing in a wet atmosphere of 50 vol % $H_2$-50 vol % $N_2$ (dew point: 60° C.) at 850° C. for 100 seconds. The heating rate V from 500 to 700° C. in the heating process of the decarburization annealing is 200° C./s.

The steel sheet is thereafter coated with an annealing separator composed mainly of MgO and containing Ca, Sr and Ba carbonates in an amount shown in Table 2 as converted to the respective alkaline earth metal, dried, and then subjected to a finish annealing comprising heating to 1200° C. in a $N_2$ atmosphere, holding at 1200° C. in a $H_2$ atmosphere for 10 hours and lowering a temperature in a $N_2$ atmosphere.

A test specimen is taken out from the thus obtained steel sheet to measure magnetic properties (iron loss $W_{17/50}$) by a method described in JIS C2550. Further, a cross section in the sheet width direction of a forsterite film in the test specimen is observed with SEM to measure an existence ratio of sulfides (precipitates) having a circle-equivalent diameter of not less than 0.5 μm among Ca, Sr and Ba sulfides per unit length in the sheet width direction.

Table 2 shows the above measured results. As seen from this table, all of the steel sheet produced under the production conditions according to embodiments of the invention is low in the existence ratio of coarse sulfides of Ca, Sr and Ba and the good iron loss property is obtained.

TABLE 2

| Steel Sheet No. | Content of alkaline earth metal in annealing separator (mass %) | | | | Existence ratio of alkaline earth metal sulfides of not less than 0.5 μm (number/μm) | Iron loss $W_{17/50}$ (W/kg) | Remarks |
|---|---|---|---|---|---|---|---|
| | Ca | Sr | Ba | Total | | | |
| 1 | 0 | 0 | 0 | 0 | 0 | 0.76 | Invention Example |
| 2 | 2.0 | 0 | 0 | 2.0 | 0.072 | 0.73 | Invention Example |
| 3 | 5.0 | 0 | 0 | 5.0 | 0.182 | 0.77 | Invention Example |
| 4 | 6.0 | 0 | 0 | 6.0 | 0.291 | 0.81 | Comparative Example |
| 5 | 0 | 2.0 | 0 | 2.0 | 0.068 | 0.72 | Invention Example |
| 6 | 0 | 5.0 | 0 | 5.0 | 0.172 | 0.77 | Invention Example |
| 7 | 0 | 6.0 | 0 | 6.0 | 0.264 | 0.82 | Comparative Example |
| 8 | 0 | 0 | 2.0 | 2.0 | 0.076 | 0.74 | Invention Example |
| 9 | 0 | 0 | 5.0 | 5.0 | 0.167 | 0.75 | Invention Example |
| 10 | 0 | 0 | 6.0 | 6.0 | 0.234 | 0.81 | Comparative Example |
| 11 | 0.5 | 0.5 | 0.5 | 1.5 | 0.041 | 0.73 | Invention Example |
| 12 | 1.0 | 1.0 | 1.0 | 3.0 | 0.113 | 0.75 | Invention Example |
| 13 | 1.5 | 1.5 | 1.5 | 4.5 | 0.142 | 0.76 | Invention Example |
| 14 | 2.0 | 2.0 | 2.0 | 6.0 | 0.275 | 0.82 | Comparative Example |

Example 3

A steel slab having a various chemical composition shown in Table 3 is manufactured by a continuous casting method. The slab is reheated to a temperature of 1400° C. and hot rolled to form a hot rolled sheet having a sheet thickness of 2.2 mm. The hot rolled sheet is subjected to a hot band annealing at 1000° C. for 50 seconds, cold rolled to have an intermediate sheet thickness of 1.7 mm, subjected to an intermediate annealing at 1100° C. for 20 seconds and finally cold rolled to form a cold rolled sheet having a sheet thickness of 0.23 mm. The work roll in a Sendzimir mill used in the final cold rolling has a roll diameter of 80 mmφ and a surface roughness Ra of 0.5 μm.

The cold rolled sheet is then subjected to a decarburization annealing in a wet atmosphere of 50 vol % $H_2$-50 vol % $N_2$ (dew point: 60° C.) at 850° C. for 100 seconds. The heating rate V from 500 to 700° C. in the heating process of the decarburization annealing is set to 200° C./s.

The steel sheet is thereafter coated with an annealing separator composed mainly of MgO and containing 2.0 mass % of Ca carbonate as converted to Ca with respect to MgO and subjected to a finish annealing comprising heating to 1200° C. in a $N_2$ atmosphere, holding at 1200° C. for 10 hours in a $H_2$ atmosphere and lowering the temperature in a $N_2$ atmosphere.

A test specimen is taken out from the thus obtained steel sheet to measure magnetic properties (iron loss $W_{17/50}$) by a method described in JIS C2550. The result is shown in Table 3. As seen from this table, all of the steel sheets obtained by using the steel slab having the chemical composition adapted to embodiments of the invention as a raw material have a good iron loss property.

TABLE 3

| Steel sheet No. | Chemical composition (mass %) | | | | | | | | Iron loss $W_{17/50}$ (W/kg) | Remarks |
|---|---|---|---|---|---|---|---|---|---|---|
| | C | Si | Mn | Al | N | S | Se | Others | | |
| 1 | 0.002 | 2.3 | 0.060 | 0.020 | 0.010 | — | — | — | 1.021 | Comparative Example |
| 2 | 0.080 | 2.3 | 0.060 | 0.020 | 0.010 | — | — | — | 0.986 | Comparative Example |
| 3 | 0.150 | 2.3 | 0.060 | 0.020 | 0.010 | — | — | — | 1.012 | Comparative Example |
| 4 | 0.001 | 2.5 | 0.060 | 0.020 | 0.010 | — | — | — | 0.855 | Comparative Example |
| 5 | 0.002 | 2.5 | 0.060 | 0.020 | 0.010 | — | — | — | 0.785 | Invention Example |
| 6 | 0.080 | 2.5 | 0.060 | 0.020 | 0.010 | — | — | — | 0.768 | Invention Example |
| 7 | 0.150 | 2.5 | 0.060 | 0.020 | 0.010 | — | — | — | 0.792 | Invention Example |
| 8 | 0.160 | 2.5 | 0.060 | 0.020 | 0.010 | — | — | — | 0.896 | Comparative Example |
| 9 | 0.001 | 3.2 | 0.060 | 0.020 | 0.010 | — | — | — | 0.852 | Comparative Example |
| 10 | 0.002 | 3.2 | 0.060 | 0.020 | 0.010 | — | — | — | 0.762 | Invention Example |
| 11 | 0.080 | 3.2 | 0.060 | 0.020 | 0.010 | — | — | — | 0.725 | Invention Example |
| 12 | 0.150 | 3.2 | 0.060 | 0.020 | 0.010 | — | — | — | 0.789 | Invention Example |
| 13 | 0.160 | 3.2 | 0.060 | 0.020 | 0.010 | — | — | — | 0.887 | Comparative Example |
| 14 | 0.080 | 3.2 | 0.008 | 0.025 | 0.010 | — | — | — | 1.235 | Comparative Example |
| 15 | 0.080 | 3.2 | 0.010 | 0.025 | 0.010 | — | — | — | 0.786 | Invention Example |
| 16 | 0.080 | 3.2 | 0.300 | 0.025 | 0.010 | — | — | — | 0.775 | Invention Example |
| 17 | 0.080 | 3.2 | 0.800 | 0.025 | 0.010 | — | — | — | 0.796 | Invention Example |
| 18 | 0.080 | 3.2 | 0.820 | 0.025 | 0.010 | — | — | — | 0.874 | Comparative Example |
| 19 | 0.080 | 3.2 | 0.070 | 0.008 | 0.010 | — | — | — | 1.341 | Comparative Example |
| 20 | 0.080 | 3.2 | 0.070 | 0.010 | 0.010 | — | — | — | 0.775 | Invention Example |
| 21 | 0.080 | 3.2 | 0.070 | 0.050 | 0.010 | — | — | — | 0.735 | Invention Example |
| 22 | 0.080 | 3.2 | 0.070 | 0.055 | 0.010 | — | — | — | 1.216 | Comparative Example |
| 23 | 0.080 | 3.2 | 0.070 | 0.025 | 0.001 | — | — | — | 1.125 | Comparative Example |
| 24 | 0.080 | 3.2 | 0.070 | 0.025 | 0.003 | — | — | — | 0.765 | Invention Example |
| 25 | 0.080 | 3.2 | 0.070 | 0.025 | 0.020 | — | — | — | 0.745 | Invention Example |

TABLE 3-continued

| Steel sheet No. | Chemical composition (mass %) | | | | | | | Iron loss $W_{17/50}$ (W/kg) | Remarks |
|---|---|---|---|---|---|---|---|---|---|
| | C | Si | Mn | Al | N | S | Se | Others | | |
| 26 | 0.080 | 3.2 | 0.070 | 0.025 | 0.025 | — | — | — | 0.984 | Comparative Example |
| 27 | 0.002 | 6.0 | 0.060 | 0.020 | 0.010 | — | — | — | 0.701 | Invention Example |
| 28 | 0.080 | 6.0 | 0.060 | 0.020 | 0.010 | — | — | — | 0.708 | Invention Example |
| 29 | 0.150 | 6.0 | 0.060 | 0.020 | 0.010 | — | — | — | 0.721 | Invention Example |
| 30 | 0.002 | 6.5 | 0.060 | 0.020 | 0.010 | — | — | — | 1.026 | Comparative Example |
| 31 | 0.080 | 6.5 | 0.060 | 0.020 | 0.010 | — | — | — | 1.035 | Comparative Example |
| 32 | 0.150 | 6.5 | 0.060 | 0.020 | 0.010 | — | — | — | 1.042 | Comparative Example |
| 33 | 0.080 | 3.2 | 0.060 | 0.025 | 0.010 | 0.001 | — | — | 0.725 | Invention Example |
| 34 | 0.080 | 3.2 | 0.060 | 0.025 | 0.010 | 0.002 | — | — | 0.714 | Invention Example |
| 35 | 0.080 | 3.2 | 0.060 | 0.025 | 0.010 | 0.030 | — | — | 0.712 | Invention Example |
| 36 | 0.080 | 3.2 | 0.060 | 0.025 | 0.010 | 0.032 | — | — | 0.726 | Invention Example |
| 37 | 0.080 | 3.2 | 0.060 | 0.025 | 0.010 | — | 0.001 | — | 0.724 | Invention Example |
| 38 | 0.080 | 3.2 | 0.060 | 0.025 | 0.010 | — | 0.002 | — | 0.711 | Invention Example |
| 39 | 0.080 | 3.2 | 0.060 | 0.025 | 0.010 | — | 0.02 | — | 0.708 | Invention Example |
| 40 | 0.080 | 3.2 | 0.060 | 0.025 | 0.010 | — | 0.10 | — | 0.714 | Invention Example |
| 41 | 0.080 | 3.2 | 0.060 | 0.025 | 0.010 | — | 0.12 | — | 0.725 | Invention Example |
| 42 | 0.080 | 3.2 | 0.060 | 0.025 | 0.010 | — | — | Cr: 0.005 | 0.723 | Invention Example |
| 43 | 0.080 | 3.2 | 0.060 | 0.025 | 0.010 | — | — | Cr: 0.010 | 0.712 | Invention Example |
| 44 | 0.080 | 3.2 | 0.060 | 0.025 | 0.010 | — | — | Cr: 0.500 | 0.717 | Invention Example |
| 45 | 0.080 | 3.2 | 0.060 | 0.025 | 0.010 | — | — | Cr: 0.520 | 0.724 | Invention Example |
| 46 | 0.080 | 3.2 | 0.060 | 0.025 | 0.010 | — | — | Cu: 0.008 | 0.726 | Invention Example |
| 47 | 0.080 | 3.2 | 0.060 | 0.025 | 0.010 | — | — | Cu: 0.010 | 0.714 | Invention Example |
| 48 | 0.080 | 3.2 | 0.060 | 0.025 | 0.010 | — | — | Cu: 0.500 | 0.716 | Invention Example |
| 49 | 0.080 | 3.2 | 0.060 | 0.025 | 0.010 | — | — | Cu: 0.550 | 0.725 | Invention Example |
| 50 | 0.080 | 3.2 | 0.060 | 0.025 | 0.010 | — | — | P: 0.004 | 0.728 | Invention Example |
| 51 | 0.080 | 3.2 | 0.060 | 0.025 | 0.010 | — | — | P: 0.005 | 0.712 | Invention Example |
| 52 | 0.080 | 3.2 | 0.060 | 0.025 | 0.010 | — | — | P: 0.500 | 0.716 | Invention Example |
| 53 | 0.080 | 3.2 | 0.060 | 0.025 | 0.010 | — | — | P: 0.550 | 0.727 | Invention Example |
| 54 | 0.080 | 3.2 | 0.060 | 0.025 | 0.010 | — | — | Ni: 0.008 | 0.727 | Invention Example |
| 55 | 0.080 | 3.2 | 0.060 | 0.025 | 0.010 | — | — | Ni: 0.010 | 0.711 | Invention Example |
| 56 | 0.080 | 3.2 | 0.060 | 0.025 | 0.010 | — | — | Ni: 1.500 | 0.712 | Invention Example |
| 57 | 0.080 | 3.2 | 0.060 | 0.025 | 0.010 | — | — | Ni: 1.600 | 0.723 | Invention Example |
| 58 | 0.080 | 3.2 | 0.060 | 0.025 | 0.010 | — | — | Sb: 0.003 | 0.726 | Invention Example |
| 59 | 0.080 | 3.2 | 0.060 | 0.025 | 0.010 | — | — | Sb: 0.005 | 0.717 | Invention Example |
| 60 | 0.080 | 3.2 | 0.060 | 0.025 | 0.010 | — | — | Sb: 0.500 | 0.716 | Invention Example |
| 61 | 0.080 | 3.2 | 0.060 | 0.025 | 0.010 | — | — | Sb: 0.550 | 0.725 | Invention Example |
| 62 | 0.080 | 3.2 | 0.060 | 0.025 | 0.010 | — | — | Sn: 0.003 | 0.728 | Invention Example |
| 63 | 0.080 | 3.2 | 0.060 | 0.025 | 0.010 | — | — | Sn: 0.005 | 0.714 | Invention Example |
| 64 | 0.080 | 3.2 | 0.060 | 0.025 | 0.010 | — | — | Sn: 0.500 | 0.715 | Invention Example |
| 65 | 0.080 | 3.2 | 0.060 | 0.025 | 0.010 | — | — | Sn: 0.550 | 0.723 | Invention Example |
| 66 | 0.080 | 3.2 | 0.060 | 0.025 | 0.010 | — | — | Mo: 0.003 | 0.729 | Invention Example |
| 67 | 0.080 | 3.2 | 0.060 | 0.025 | 0.010 | — | — | Mo: 0.005 | 0.710 | Invention Example |
| 68 | 0.080 | 3.2 | 0.060 | 0.025 | 0.010 | — | — | Mo: 0.100 | 0.713 | Invention Example |
| 69 | 0.080 | 3.2 | 0.060 | 0.025 | 0.010 | — | — | Mo: 0.110 | 0.728 | Invention Example |
| 70 | 0.080 | 3.2 | 0.060 | 0.025 | 0.010 | — | — | B: 0.0001 | 0.723 | Invention Example |
| 71 | 0.080 | 3.2 | 0.060 | 0.025 | 0.010 | — | — | B: 0.0002 | 0.712 | Invention Example |
| 72 | 0.080 | 3.2 | 0.060 | 0.025 | 0.010 | — | — | B: 0.0025 | 0.713 | Invention Example |
| 73 | 0.080 | 3.2 | 0.060 | 0.025 | 0.010 | — | — | B: 0.0030 | 0.725 | Invention Example |
| 74 | 0.080 | 3.2 | 0.060 | 0.025 | 0.010 | — | — | Nb: 0.0005 | 0.724 | Invention Example |
| 75 | 0.080 | 3.2 | 0.060 | 0.025 | 0.010 | — | — | Nb: 0.0010 | 0.710 | Invention Example |
| 76 | 0.080 | 3.2 | 0.060 | 0.025 | 0.010 | — | — | Nb: 0.0100 | 0.709 | Invention Example |
| 77 | 0.080 | 3.2 | 0.060 | 0.025 | 0.010 | — | — | Nb: 0.0110 | 0.728 | Invention Example |
| 78 | 0.080 | 3.2 | 0.060 | 0.025 | 0.010 | — | — | V: 0.0005 | 0.729 | Invention Example |
| 79 | 0.080 | 3.2 | 0.060 | 0.025 | 0.010 | — | — | V: 0.0010 | 0.712 | Invention Example |
| 80 | 0.080 | 3.2 | 0.060 | 0.025 | 0.010 | — | — | V: 0.0100 | 0.711 | Invention Example |
| 81 | 0.080 | 3.2 | 0.060 | 0.025 | 0.010 | — | — | V: 0.0110 | 0.727 | Invention Example |

The invention claimed is:

1. A grain-oriented electrical steel sheet having a chemical composition comprising C: not more than 0.005 mass %, Si: 2.5-6.0 mass %, Mn: 0.01-0.80 mass %, S: not more than 0.005 mass %, Se: not more than 0.005 mass %, N: not more than 0.005 mass % and the residue being Fe and inevitable impurities and provided on its surface with a forsterite film composed mainly of forsterite, characterized in that an average length L in a rolling direction of crystal grains that penetrate through the steel sheet in the thickness direction thereof is not more than 25 mm, a number ratio P of crystal grains having a length in the rolling direction of not more than 5 mm to total crystal grains is within the range of 40 to 90%, and an existence ratio of sulfides of at least one alkaline earth metal selected from Ca, Sr and Ba having a circle-equivalent diameter of not less than 0.5 μm when observing a cross section of the forsterite film in the sheet width direction is not more than 0.2/μm per unit length in the sheet width direction, wherein the grain-oriented electrical steel sheet has an iron loss $W_{17/50}$ of not more than 0.80 W/Kg, at a magnetic excitation frequency of 50 Hz, according to JIS C2550.

2. The grain-oriented electrical steel sheet according to claim 1,
which contains at least one selected from Cr: 0.010-0.500 mass %, Ni: 0.010-1.500 mass %, Sn: 0.005-0.500 mass %, Sb: 0.005-0.500 mass %, P: 0.005-0.500 mass %, Cu: 0.010-0.500 mass %, Mo: 0.005-0.100 mass %, B: 0.0002-0.0025 mass %, Nb: 0.0010-0.0100 mass % and V: 0.0010-0.0100 mass % in addition to the above chemical composition.

3. The grain-oriented electrical steel sheet according to claim 1, wherein the grain-oriented electrical steel sheet has the iron loss $W_{17/50}$ in the range of 0.701 to 0.796 W/g, at a magnetic excitation frequency of 50 Hz, according to JIS C2550.

4. The grain-oriented electrical steel sheet according to claim 1, wherein the grain-oriented electrical steel sheet is produced by a method comprising subjecting the a cold-rolled steel sheet decarburization and annealing for primary recrystallization, applying an annealing separator consisting mainly of MgO to a surface of the steel sheet, drying, and then annealing to a finish anneal for secondary recrystallization,
wherein a surface roughness of a work roll used in a final cold rolling of the cold rolling falls within the range of 0.01 to 3.0 μm as an arithmetic average roughness Ra.

5. The grain-oriented electrical steel sheet according to claim 1, wherein the grain-oriented electrical steel sheet is produced from a steel slab having a chemical composition comprising C: 0.002 to 0.15 mass %, Si: 2.5-6.0 mass %, Mn: 0.01-0.80 mass %, Al: 0.010 to 0.050 mass %, N: 0.003 to 0.020 mass % and the residue being Fe and inevitable impurities.

6. The grain-oriented electrical steel sheet according to claim 5, wherein the steel slab comprises C: 0.01 to 0.15 mass %.

7. The grain-oriented electrical steel sheet according to claim 1, wherein the existence ratio of sulfides of at least one alkaline earth metal selected from Ca, Sr and Ba having a circle-equivalent diameter of not less than 0.5 μm when observing a cross section of the forsterite film in the sheet width direction is at least 0.01/μm and not more than 0.2/μm per unit length in the sheet width direction.

8. The grain-oriented electrical steel sheet according to claim 1, further comprising sulfides of at east one alkaline earth metal selected from Ca, Sr and Ba.

9. A method for producing the grain-oriented electrical steel sheet as claimed in claim 1 by heating and hot rolling a steel slab having a chemical composition comprising C: 0.002 to 0.15 mass %, Si: 2.5-6.0 mass %, Mn: 0.01-0.80 mass %, Al: 0.010 to 0.050 mass %, N: 0.003 to 0.020 mass % and the residue being Fe and inevitable impurities to form a hot rolled sheet, subjecting the hot rolled sheet to a hot band annealing and further to a single cold rolling or two or more cold rollings including an intermediate annealing therebetween to form a cold roiled sheet having a final sheet thickness, subjecting the cold rolled sheet to decarburization annealing for primary recrystallization, applying an annealing separator composed mainly of MgO to the surface of the steel sheet, drying and subjecting to finish annealing comprised of a secondary recrystallization annealing and a purification annealing,
characterized in that
a heating rate within a temperature range of 500 to 700° C. in a heating process of the decarburization annealing is not less than 80° C./s,
a surface roughness of a work roll used in a final cold rolling of the cold rolling falls within the range of 0.01 to 3.0 μm an arithmetic average roughness Ra, and
a compound of at least one alkaline earth metal selected from Ca, Sr and Ba is contained in an amount of 0 to 5 mass % in total as converted to an alkaline earth metal to MgO as the annealing separator composed mainly of MgO.

10. The method for producing a grain-oriented electrical steel sheet according to claim 9,
wherein the steel slab contains one or two selected from S: 0.002-0.030 mass % and Se: 0.002-0.100 mass % in addition to the above chemical composition.

11. The method for producing a grain-oriented electrical steel sheet according to claim 10,
wherein the steel ab contains at least one selected from Cr: 0.010-0.500 mass %, Ni: 0.010-1.500 mass %, Sn: 0.005-0.500 mass %, Sb: 0.005-0.500 mass %, P: 0.005-0.500 mass %, Cu: 0.010-0.500 mass %, Mo: 0.005-0.100 mass %, B: 0.0002-0.0025 mass %, Nb: 0.0010-0.0100 mass % and V: 0.0010-0.0100 mass % in addition to the above chemical composition.

12. The method for producing a grain-oriented electrical steel sheet according to claim 9,
wherein the steel slab contains at least one selected from Cr: 0.010-0.500 mass %, Ni: 0.010-1.500 mass %, Sn: 0.005-0.500 mass %, Sb: 0.005-0.500 mass %, P: 0.005-0.500 mass %, Cu: 0.010-0.500 mass %, Mo: 0.005-0.100 mass %, B: 0.0002-0.0025 mass %, Nb: 0.0010-0.0100 mass % and V: 0.0010-0.0100 mass % in addition to the above chemical composition.

* * * * *